US010018036B2

(12) United States Patent
Ellmauthaler et al.

(10) Patent No.: US 10,018,036 B2
(45) Date of Patent: Jul. 10, 2018

(54) DISTRIBUTED SENSING SYSTEMS AND METHODS WITH I/Q DATA BALANCING BASED ON ELLIPSE FITTING

(71) Applicant: HALLIBURTON ENERGY SERVICES, INC., Houston, TX (US)

(72) Inventors: Andreas Ellmauthaler, Rio de Janiero (BR); Leonardo de Oliveira Nunes, Rio de Janiero (BR); David Andrew Barfoot, Houston, TX (US); Christopher Stokely, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/325,063

(22) PCT Filed: Jul. 30, 2014

(86) PCT No.: PCT/US2014/048798
§ 371 (c)(1),
(2) Date: Jan. 9, 2017

(87) PCT Pub. No.: WO2016/018280
PCT Pub. Date: Feb. 4, 2016

(65) Prior Publication Data
US 2017/0183959 A1   Jun. 29, 2017

(51) Int. Cl.
*E21B 47/12* (2012.01)
*G08C 23/04* (2006.01)
(Continued)

(52) U.S. Cl.
CPC ............ *E21B 47/123* (2013.01); *G08C 23/04* (2013.01); *G01D 5/266* (2013.01); *G01D 5/268* (2013.01);
(Continued)

(58) Field of Classification Search
CPC ....... E21B 47/123; E21B 47/12; G08C 23/04; G08C 23/00; G08C 23/06; G01D 5/266;
(Continued)

(56) References Cited

U.S. PATENT DOCUMENTS 6,035,004 A * 3/2000 Nakata ................... H03D 3/008
324/670
8,023,116 B1 * 9/2011 Zumberge .......... G01B 9/02081
356/450
(Continued)

FOREIGN PATENT DOCUMENTS

EP     1750086     2/2007

OTHER PUBLICATIONS

Author: Wu et al, Title: Correction of Nonlinearity in One Frequency Optical Interferometry, Date: Apr. 1996, Publisher: Measurement Science and Technology, vol. 7, No. 4, pp. 520-524.*
(Continued)

*Primary Examiner* — Hai Phan
*Assistant Examiner* — Franklin Balseca
(74) *Attorney, Agent, or Firm* — Gilliam IP PLLC

(57) ABSTRACT

A system includes an optical fiber and an interrogator to provide source light to the optical fiber. The system also includes a receiver coupled to the optical fiber. The receiver includes at least one fiber optic coupler that receives backscattered light and that produces optical interferometry signals from the backscattered light. The receiver also includes photo-detectors that produce an electrical signal for each of said optical interferometry signals. The system also includes at least one digitizer that digitizes the electrical signals. The system also includes at least one processing unit that calculates I/Q data from the digitized electrical signals, corrects the I/Q data based on ellipse fitting, determines phase values based on the corrected I/Q data, and determines (Continued)

distributed sensing parameter values based on the phase values.

20 Claims, 9 Drawing Sheets

(51) Int. Cl.
    *G01D 5/26*     (2006.01)
    *G01D 5/353*     (2006.01)

(52) U.S. Cl.
    CPC ..... *G01D 5/35358* (2013.01); *G01D 5/35361* (2013.01)

(58) Field of Classification Search
    CPC ...... G01D 5/268; G01D 5/34; G01D 5/35303; G01D 5/35306; G01D 5/35338; G01D 5/35354; G01D 5/35358; G01D 5/35361; G01B 2290/45; G01B 2290/70
    See application file for complete search history.

(56) References Cited

U.S. PATENT DOCUMENTS

| | | | |
|---|---|---|---|
| 2005/0027489 A1 | 2/2005 | Kasevich et al. | |
| 2007/0036555 A1 | 2/2007 | Chen et al. | |
| 2010/0172553 A1* | 7/2010 | Volkau | A61B 6/504 382/128 |
| 2011/0044494 A1* | 2/2011 | Bradley | G06T 1/0064 382/100 |
| 2012/0057432 A1* | 3/2012 | Hill | E21B 43/11857 367/81 |
| 2012/0067118 A1* | 3/2012 | Hartog | E21B 41/00 73/152.16 |
| 2012/0237205 A1 | 9/2012 | Duncan et al. | |
| 2013/0325286 A1* | 12/2013 | Lacaille | G05B 23/0221 701/99 |

OTHER PUBLICATIONS

PCT International Search Report and Written Opinion, dated Apr. 30, 2015, Appl No. PCT/US2014/048798, "Distributed Sensing Systems and Methods with I/Q Data Balancing on Ellipse Fitting," Filed Jul. 30, 2014, 15 pgs.

Fitzgibbon, Andrew, et al., "Direct Least Square Fitting of Ellipses," IEEE Transactions on Pattern Analysis and Machine Intelligence, vol. 21(5), pp. 476-480, (1999).

Petrou, C.S., et al., "Impact of Transmitter and Receiver Imperfections on the Performance of Coherent Optical QPSK Communication Systems," 21st Annual Meeting of the IEEE Lasers and Electro-Optics Society, pp. 410-411, (2008).

Ruan, Dan, et al., "Adaptive Ellipse Tracking and a Convergence Proof," Technical Report No. 382, University of Michigan, May 2007, 12 pgs.

CA Application Serial No. 2,954,946, Examiner's Letter, dated Jan. 31, 2018, 3 pages.

PCT Application Serial No. PCT/US2014/048798, International Preliminary Report on Patentability, dated Jan. 31, 2017, 11 pages.

* cited by examiner

DISTRIBUTED SENSING SYSTEMS AND METHODS WITH I/Q DATA BALANCING BASED ON ELLIPSE FITTING

BACKGROUND

Fiber optic sensing systems may be used to monitor downhole parameters such as vibrations, acoustics, pressure, and temperature changes. One example sensing system is referred to as distributed acoustic sensing (DAS). In a DAS system, an interrogation beam is conveyed along an optical fiber, and interferometric techniques are applied to perform phase analysis of backscattered light. The phase information of backscattered light can be correlated with acoustic activity at points along the optical fiber. The quality of the acoustic information obtained is therefore dependent on the accuracy of the phase analysis.

One way to perform phase analysis involves two auxiliary signals that have a relative phase-shift of 90°, called in-phase and quadrature signals (I/Q). However, imperfections of the involved optical components cause various issues, coined "I/Q imbalance," such that straightforward extraction of phase information from I/Q data is usually not possible. Example I/Q imbalance issues include time-varying effects such as a DC offset as well as an amplitude and/or phase mismatch between the received I and Q signals. Such I/Q imbalance issues affect the accuracy of subsequent digital signal processing algorithms to recover phase information or related parameters.

BRIEF DESCRIPTION OF THE DRAWINGS

Accordingly, there are disclosed herein distributed sensing systems and methods with I/Q balancing based on ellipse fitting. In the drawings.

Figure 1A:
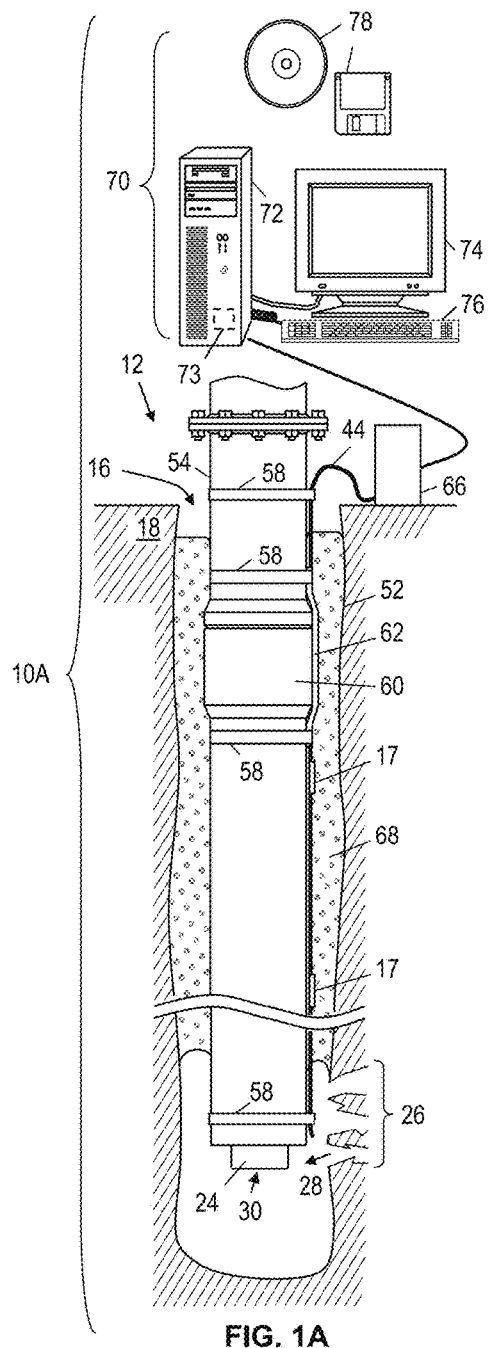
FIGS. 1A-1C are schematic diagrams of optical distributed sensing well environments.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

The problems outlined above are at least in part addressed by I/Q data balancing scheme that uses a novel ellipse fitting approach. The proposed methodology is able to correct I/Q data imperfections with increased robustness when compared to previous I/Q data balancing attempts and is able to improve the overall signal-to-noise ratio (SNR) of an extracted distributed sensing parameter (e.g., an acoustic level) when compared to other state-of-the-art solutions. As a consequence, the inherent phase information of I/Q signals can be extracted with a higher confidence level and improved temporal consistency. The disclosed I/Q data balancing scheme can be applied to improve the performance of distributed acoustic sensing (DAS) systems, time-domain multiplexed interferometry, and/or other photonic sensing solutions where the information of interest is conveyed in the phase of the optical signal. While other applications are possible, the disclosed I/Q data balancing scheme was developed for use with homodyne or heterodyne DAS systems. The disclosed I/Q data balancing scheme can be employed, for example, to improve performance of a DAS system that enables real-time fluid flow monitoring using acoustic signatures, flow-regime determination, wellbore integrity monitoring, and event detection.

In at least some embodiments, a distributed sensing system includes an optical fiber and an interrogator to provide source light to the optical fiber. The distributed sensing system also includes a receiver coupled to the optical fiber. The receiver includes at least one fiber optic coupler that receives backscattered light and that produces optical interferometry signals from the backscattered light. The receiver also includes photo-detectors that produce an electrical signal for each of said optical interferometry signals. The distributed sensing system also includes at least one digitizer that digitizes the electrical signals. Further, the distributed sensing system includes at least one processing unit that calculates I/Q data from the digitized electrical signals, corrects the I/Q data based on ellipse fitting, determines phase values based on the corrected I/Q data, and determines distributed sensing parameter values based on the phase values.

Figure 1B:
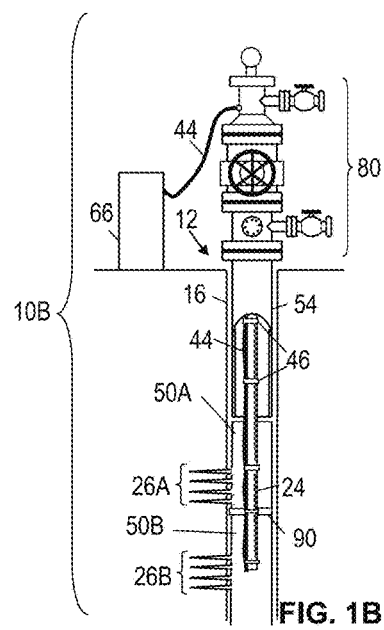
Figure 1C:
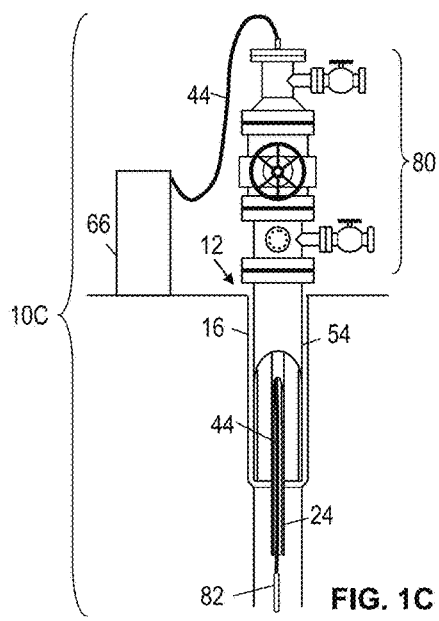

The disclosed techniques are best understood in an application context. Turning now to the figures, FIGS. 1A-1C show illustrative optical distributed sensing well environments 10A-10C. In well environment 10A, a drilling rig has been used to drill and complete well 12 in a typical manner, with a casing string 54 positioned in the borehole 16 that penetrates into the earth 18. The casing string 54 includes multiple tubular casing sections (usually about 30 feet long) connected end-to-end by couplings 60. (FIG. 1 is not to scale). Typically the casing string includes many such couplings.) Within the well 12, a cement slurry 68 has been injected into the annular space between the outer surface of the casing string 54 and the inner surface of the borehole 16 and allowed to set. A production tubing string 24 has been positioned in an inner bore of the casing string 54.

The well 12 is adapted to guide a desired fluid (e.g., oil or gas) from a bottom of the borehole 16 to a surface of the earth 18. Perforations 26 have been formed at a bottom of the borehole 16 to facilitate the flow of a fluid 28 from a surrounding formation into the borehole and thence to the surface via an opening 30 at the bottom of the production tubing string 24. Note that this well configuration is illustrative and not limiting on the scope of the disclosure. For example, fluid flow to or from a formation is possible at other points along the well 12 (not only at the bottom). Further, the well 12 may correspond to a production well or injection well. Alternatively, optical distributed sensing as described herein may be deployed with a monitoring well.

The optical distributed sensing well environment 10A includes an interface 66 coupled to a fiber optic cable 44 for distributed downhole sensing. The interface 66 is located on the surface of the earth 18 near the wellhead, i.e., a "surface interface". In the embodiment of FIG. 1A, the fiber optic cable 44 extends along an outer surface of the casing string 54 and is held against the outer surface of the casing string 54 at spaced apart locations by multiple bands 58 that extend around the casing string 54. A protective covering 62 may be installed over the fiber optic cable 44 at each of the couplings 60 of the casing string 54 to prevent the fiber optic cable 44 from being pinched or sheared by the coupling's contact with the borehole wall. The protective covering 62 may be held in place, for example, by two of the bands 58 installed on either side of coupling 60.

In at least some embodiments, the fiber optic cable 44 terminates at surface interface 66 with an optical port adapted for coupling the fiber(s) in cable 44 to a light source and a detector. The light source transmits light pulses along the fiber optic cable 44, which contains a fiber with scattering impurities. As each pulse of light propagates along the fiber, some of the pulse is scattered back along the fiber from every point on the fiber. Thus the entire fiber acts as a distributed sensor. The optical port of the surface interface 66 communicates backscattered light to the detector, which responsively produces interferometry measurements from backscattered light attributes (e.g., phase or phase shift) corresponding to different points along the fiber optic cable 44. From the recovered phase information, the value of a downhole parameter sensed by the fiber at the location of the backscatter can be determined. As part of the phase recovery process, I/Q balancing based on ellipse fitting is performed as described herein.

As shown, the optical distributed sensing well environment 10A also includes a computer 70 coupled to the surface interface 66 to control the light source and detector. The illustrated computer 70 includes a chassis 72 with at least one processing unit 73. Further the computer 70 includes an output device 74 (e.g., a monitor as shown in FIG. 1A, or a printer), an input device 76 (e.g., a keyboard), and non-transient information storage media 78 (e.g., magnetic or optical data storage disks). It should be appreciated that the computer 70 may be implemented in different forms including, for example, an embedded computer permanently installed as part of the surface interface 66, a portable computer that is plugged into or wirelessly linked to the surface interface 66 as desired to collect data, and a remote desktop computer coupled to the surface interface 66 via a wireless link and/or a wired computer network. In at least some embodiments, the computer 70 is adapted to receive the digitized interferometry signals from the surface interface 66 and to responsively determine distributed sensing parameter values as a function of position along the length of the fiber optic cable 44 and time. Example distributed sensing parameters include temperature, acoustic energy, vibrational energy (including active or passive seismic), pressure, strain, deformation, chemical concentrations, nuclear radiation intensity, electromagnetic energy, and/or acceleration.

In at least some implementations, the non-transient information storage media 78 stores a software program for execution by computer 70. The instructions of the software program cause the computer 70 to recover phase information from digitized interferometry signals received from surface interface 66 using I/Q balancing based on ellipse fitting as described herein. With the recovered phase information, distributed sensing parameter values at different points along the fiber optic cable 44 (e.g., every 2 meters) can be determined. The instructions of the software program may also cause the computer 70 to display information associated with distributed sensing parameter values via the output device 74.

FIG. 1B shows an alternative optical distributed sensing well environment 10B, where the fiber optic cable 44 is strapped to the outside of the production tubing 24 rather than the outside of casing 54. Rather than exiting the well 12 from the annular space outside the casing 54, the fiber optic cable 44 exits through an appropriate port in "Christmas tree" 80 (i.e., the assembly of pipes, valves, spools, and fittings connected to the top of the well 12 to direct and control the flow of fluids to and from the well 12) and couples to surface interface 66, which may include optical interrogation and receiver components to perform interferometry analysis of backscattered light along fiber optic cable 44 as described herein. Further, a computer (e.g., computer 70) may receive digitized interferometry signals from surface interface 66, and may recover phase information by balancing I/Q data based on ellipse fitting as described herein. The phase information or related distributed sensing parameters may be stored and/or displayed. Further, logs and images derived from distributed sensing parameters may be stored and/or displayed.

In the optical distributed sensing well environment 10B, the fiber optic cable 44 extends along the outer surface of the production tubing string 24 and is held against the outer surface of the production tubing string 24 at spaced apart locations by multiple bands 46 that extend around the production tubing string 24. In some embodiments, a portion of the fiber optic cable 44 (a hanging tail) extends past the production tubing string 24. In the optical distributed sensing well environment 10B, two perforations 26A and 26B have been created in borehole 16 to facilitate obtaining formation fluids from two different zones 50A and 50B defined by a packer 90 that seals an annulus around the production tubing string 24. More specifically, formation fluid enters zone 50A and production tubing string 24 via the perforation 26A, while formation fluid enters zone 50B and production tubing string 24 via the perforation 26B. As shown, the fiber optic cable 44 extends through the different zones 50A and 50B to enable distributed sensing operations along well 12 including zones 50A and 50B. Although only two zones 50A and 50B are shown for optical distributed sensing well environment 10B, it should be appreciated that additional zones may be defined along well 12.

FIG. 1C shows an alternative optical distributed sensing well environment 10C, where the fiber optic cable 44 is suspended inside production tubing 24. A weight 82 or other conveyance mechanism is employed to deploy and possibly anchor the fiber optic cable 44 within the production tubing 24 to minimize risks of tangling and movement of the fiber optic cable 44 from its desired location. The fiber optic cable 44 exits the well 12 via an appropriate port in Christmas tree 80 and attaches to the surface interface 66. Again, surface interface 66 and a computer (e.g., computer 70) enables interferometry analysis of backscattered light along fiber optic cable 44 and recovery of phase information, where I/Q balancing based on ellipse fitting is applied as described herein.

Other alternative optical distributed sensing well environments employ composite tubing with one or more optical fibers embedded in the wall of the tubing. The composite tubing can be employed as the casing and/or the production string. Alternatively, a fiber optic cable such as cable 44 could be arranged inside or outside of normal, metallic coiled tubing. Further, a fiber optic cable such as cable 44 and a weighted section of transmission line may be run on the end of standard electric cable.

Figure 2:
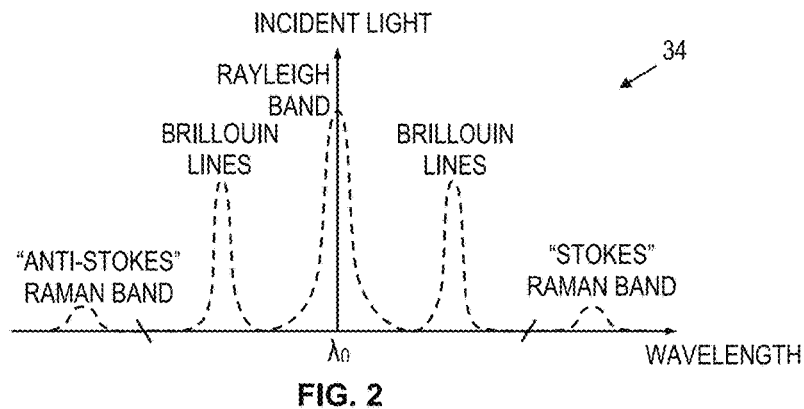
FIG. 2 is a graph showing optical intensity versus wavelength for various forms of optical backscattering.

FIG. 2 shows a graph 34 illustrating optical intensity versus wavelength for various forms of optical backscattering. At the center of the abscissa is the wavelength $\lambda_0$ of the light initially launched into the waveguide. Rayleigh backscattering has the highest intensity and is centered at the wavelength $\lambda_0$. Rayleigh backscattering is due to microscopic inhomogeneities of refractive index in the waveguide material matrix. Note that Raman backscattering (which is due to thermal excited molecular vibration known as optical phonons) has an intensity which varies with temperature T, whereas Brillouin backscattering (which is due to thermal excited acoustic waves known as acoustic phonons) has a wavelength which varies with both temperature T and strain ε. Detection of Raman backscattering is typically used in DTS systems, due in large part to its direct relationship between temperature T and intensity, and almost negligent sensitivity to strain E.

However, the Raman backscattering intensity is generally significantly less than that of Rayleigh or Brillouin backscattering, giving it a correspondingly lower signal-to-noise ratio. Consequently, it is common practice to sample the Raman backscattering many times and digitally average the readings, which results in an effective sample rate of from tens of seconds to several minutes, depending on the desired signal-to-noise ratio, fiber length and desired accuracy.

Figure 3:
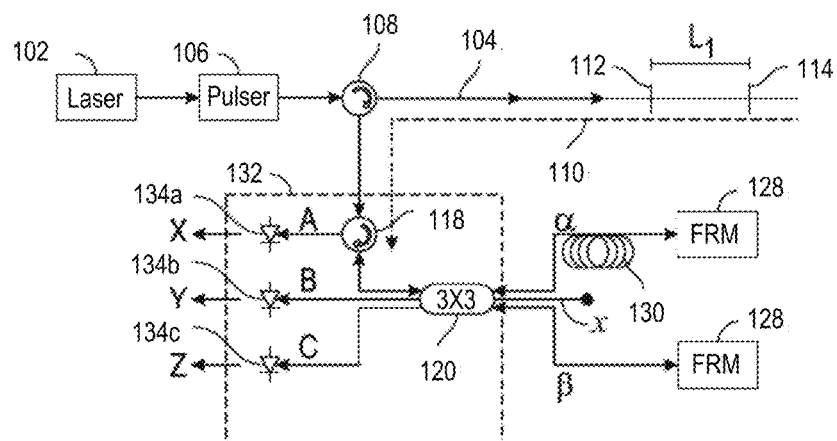
FIG. 3 is a schematic diagram of an optical phase interferometric sensing arrangement.

FIG. 3 depicts one optical phase interferometric sensing arrangement 100. The arrangement 100 includes a laser 102, or other light source, that generates an interrogation signal on a distributed sensing fiber 104. The laser 102 may provides a pulsed or non-pulsed interrogation signal. If a non-pulsed interrogation signal is output from the laser 102, a pulser 106 may be employed to pulse the interrogation signal. The pulsed interrogation signal may then interact with a first circulator 108 which couples the interrogation signal to the distributed sensing fiber 104.

As each interrogation signal pulse travels through the distributed sensing fiber 104, a portion of the pulse energy is reflected due to reflective elements or imperfections along the distributed sensing fiber 104. For illustrative purposes, the reflected signal is depicted in FIG. 3 as return signal 110. In some embodiments, the return signal 110 may be generated from discrete reflective elements placed along the distributed sensing fiber 104, such as fiber Bragg gratings (FBGs) arranged at positions 112 and 114. Alternatively, when performing distributed acoustic sensing (DAS), the return signal 110 may be generated from inherent reflection within the distributed sensing fiber 104 due to fiber imperfections (e.g., impurities). When such scattering occurs elastically, it may correspond to Rayleigh backscatter. In FIG. 3, the backscatter is depicted as occurring at the positions 112 and 114 along the distributed sensing fiber 104. However, those of skill in the art will recognize that there may be numerous other reflection points along the distributed sensing fiber 104.

The first circulator 108 additionally couples the return signal 110 to a receiver 132. In at least some embodiments, the receiver 132 includes a second circulator 118 which conveys the return signal 110 a 3×3 fiber optic coupler 120.

The fiber optic coupler 120 distributes the return signal 110 across three paths labeled α, β, x. The x path is terminated with an absorber and is not used further. The α and β paths are each terminated with a Faraday rotator mirror (FRM) 128 that reflects the signals to the fiber optic coupler 120, albeit with a polarization reversal that compensates for any polarization-shifts inadvertently introduced along the α and β paths. A delay coil 130 is included in the α path to introduce a delay in the reflected signal relative to the signal reflected along the β path. Further, a dither signal or phase modulation may be introduced in either of the α or β paths to facilitate distributed sensing data recovery. The dither signal may be introduced, for example, by controlling the temperature of system components, controlling temperature along an optical fiber path, controlling strain along an optical fiber path, and/or otherwise controlling the environment of system components. Another way to introduce a dither signal is with a dither generator (e.g., based on lithium niobate). Further, it should be appreciated that arrangement 100 is only an example, and that a dither signal can be used for both heterodyne and homodyne interferometry. Further, in some embodiments, a dither signal may be applied before light pulses are conveyed to the optical fiber (e.g., fiber 104) used for distributed sensing.

Returning to the discussion of FIG. 3, the fiber optic coupler 120 combines the signals from the α and β (and the unused x) paths to form three optical interferometry signals A, B, C. The delay introduced between the α and β paths corresponds to the distance or "sensing window" L1 between the reflection points 112, 114 on the distributed sensing fiber 104, enabling the phase change incurred over this length to be measured and monitored as an interferometric signal phase. Due to the nature of the fiber optic coupler 120, the optical interferometry signals A, B, C have mutual phase separations of 120°. For example, as the α and β signals enter the 3×3 coupler 120, the interferometric signal A exiting the fiber optic coupler 120 may be α+β∠0°, B may be α+(β∠+120°), and C may be α+(β∠−120°).

The optical phase interferometric sensing arrangement 100 also implements single-ended detectors 134a-134c, which receive the optical interferometry signals A, B, and C. Examples of single-ended detectors 134a-134c include p-intrinsic-n field-effect-transistors (PINFETs), where optical receivers and high gain transimpedance amplifiers are used. In an exemplary operation, measurements such as dynamic strain, acoustics, and vibrations may be determined through analysis of the outputs of the single-ended detectors 134a-134c to determine the associated optical phase shift. The following equations may be used to represent the outputs of the fiber optic coupler 120 as:

$$A = k + \cos[2f\pi t]P_\alpha + \cos[2f\pi t + \phi]P_\beta \tag{1}$$

$$B = k + \cos[2f\pi t]P_\alpha + \cos\left[2f\pi t + \phi + \left(\frac{2\pi}{3}\right)\right]P_\beta \tag{2}$$

$$C = k + \cos[2f\pi t]P_\alpha + \cos\left[2f\pi t + \phi - \left(\frac{2\pi}{3}\right)\right]P_\beta \tag{3}$$

where k is the optical power of non-interfering signals (e.g., ASE noise from an optical amplifier (not shown) and light with mismatched polarization), f is the optical frequency of the interrogation light, φ is the optical phase difference between the two light signals from the two optical paths (α and β) of the compensating interferometer, and $P_\alpha$ and $P_\beta$ represent optical amplitude of the two signals from optical paths α and β. As earlier noted, the fiber optic coupler 120 of FIG. 3 generates optical interferometry signals A, B, and C, which are separated by 120°, thus signal B is shifted by $$+120°\left(=\frac{2\pi}{3}\right)$$

and signal C is shifted by $$-120°\left(=-\frac{2\pi}{3}\right).$$

In at least some embodiments, the single-ended detectors 134a-134c correspond to square law detectors with a bandwidth much lower than the optical frequency (e.g., less than 1 GHz). In such case, the electrical signals (labeled X, Y, and Z) obtained from the single-ended detectors 134a-134c can be approximated as follows:

$$X=(\tfrac{1}{2})(2k^2+P_\alpha^2+2\cos[\phi]P_\alpha P_\beta+P_\beta^2) \quad (4)$$

$$Y=(\tfrac{1}{2})(2k^2+P_\alpha^2-(\cos[\phi]+\sqrt{3}\sin[\phi])P_\alpha P_\beta+P_\beta^2) \quad (5)$$

$$Z=(\tfrac{1}{2})(2k^2+P_+^2+(-\cos[\phi]+\sqrt{3}\sin[\phi])P_\alpha P_\beta+P_\beta^2) \quad (6)$$

Using the X, Y, and Z values, the in-phase (I) and quadrature (Q) terms may be calculated as:

$$I=X+Y-2Z=(3/2)(\cos[\phi]-\sqrt{3}\sin[\phi])P_\alpha P_\beta \quad (7)$$

$$Q=\sqrt{3}(X-Z)=(3/2)(\sqrt{3}\cos[\phi]+\sin[\phi])P_\alpha P_\beta \quad (8)$$

albeit with a coordinate rotation of $-\pi/3$. Taking this coordinate rotation into account gives the following equation for obtaining a phase from I/Q data:

$$\phi = \text{ArcTan}\left[\frac{Q}{I}\right]+\left(\frac{\pi}{3}\right) \quad (9)$$

Because the single-ended detectors 134a-134c are square law detectors, the outputs (i.e., equations 4-6) contain squared terms ($k^2$, $P_\alpha^2$, and $P_\beta^2$) that do not provide phase information and create a DC offset signal that varies as a function of time, but not phase. Therefore, use of the single-ended detectors 134a-134c may result in saturation and failure to utilize the full dynamic range of the analog-to-digital circuitry. For more information regarding optical phase demodulation using an optical phase interferometric sensing arrangement such as arrangement 100, reference may be had to International Application Number PCT/US14/19232, entitled "Interferometric High Fidelity Optical Phase Demodulation" and filed Feb. 28, 2014.

It should be appreciated that the disclosed I/Q balancing methodology may be used with other sensing arrangements. For example, U.S. Pat. No. 7,764,363 and U.S. Pat. Pub. No. 2012/0067118 describe other sensing arrangements for which the disclosed I/Q balancing methodology may be used. In general, the disclosed I/Q balancing methodology may be applied to any distributed sensing system or sensor-based system, where quadrature demodulation is used to track a physical parameter such as strain, acoustics, vibrations, etc.

The effect of imperfect optical components in an optical phase interferometric sensing arrangement such as arrangement 100 is an I/Q imbalance corresponding to time-varying changes to the DC offset as well as an amplitude and/or phase mismatch between the I and Q signals. In accordance with at least some embodiments, corrections are applied to I/Q data to account for I/Q imbalance. The corrected I/Q data can then be used to recover phase information and related distributed sensing parameter values.

Figure 4:
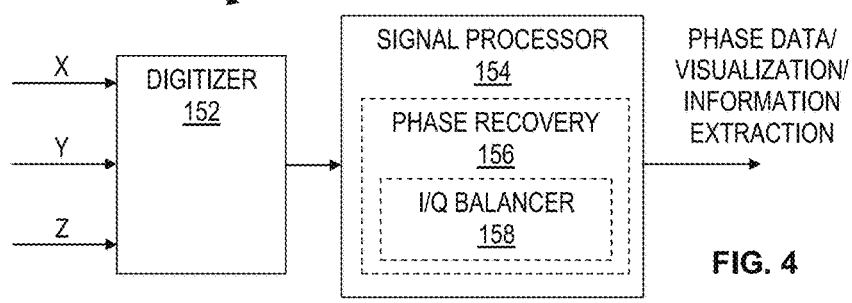
FIG. 4 is a block diagram of a signal processing arrangement.

FIG. 4 shows an illustrative signal processing arrangement 150 having a digitizer 152 that digitizes signals such as X, Y, Z, and signal processor 154 that receives the digitized signals from the digitizer 152. In accordance with at least some embodiments, the signal processor 154 comprises a phase recovery module 156 (e.g., to perform quadrature demodulation of phase) with I/Q balancer 158. For example, the signal processor 154 may correspond to one or more central processing unit (CPUs) or application-specific integrated circuits (ASICs) that execute software or firmware instructions corresponding to phase recovery module 156 with I/Q balancer 158. The output of the signal processor 154 corresponds to phase data that can be stored, visualized, correlated with distributed sensing parameters, and/or used for other information extraction.

In some embodiments, at least some of the components represented in arrangements 100 and 150 may be implemented with surface interface 66 and/or computer 70. As an example, the laser 102, pulser 106, and first circulator 108 may be part of an interrogator included with surface interface 66. Further, the receiver 132, and α and β paths may correspond to receiver or interferometry components included with surface interface 66. Further, the digitizer 152 may be included with surface interface 66. Meanwhile, the signal processor 154 may be part of surface interface 66 or computer 70.

In at least some embodiments, correcting for I/Q imbalance involves introducing a dither signal (e.g., as previously mentioned for FIG. 3) with known properties, and correcting the data such that the output dither signal resembles the input dither signal as closely as possible.

Figure 5A:
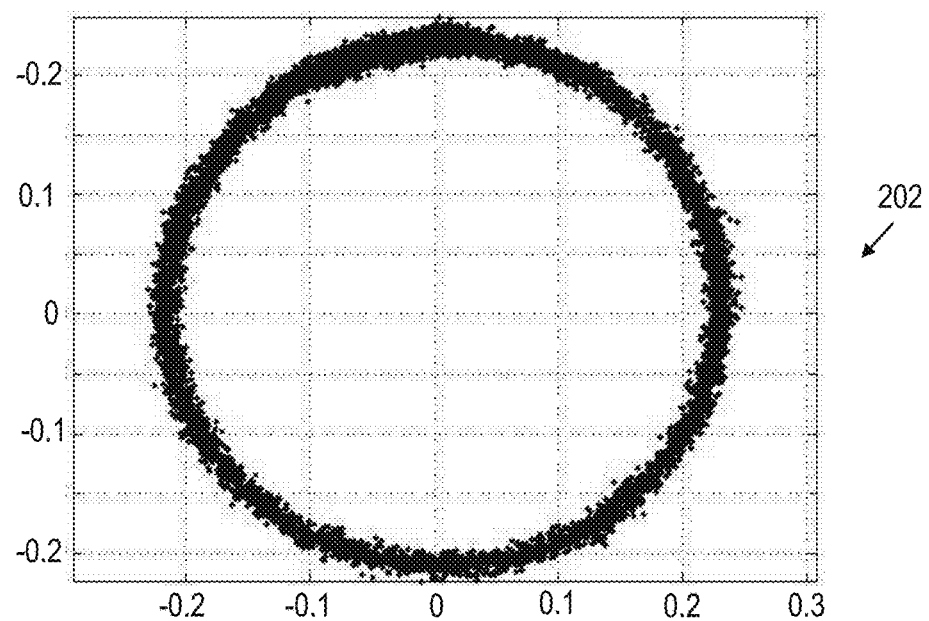
FIG. 5A is a graph showing an I/Q data plot with light distortion.
Figure 5B:
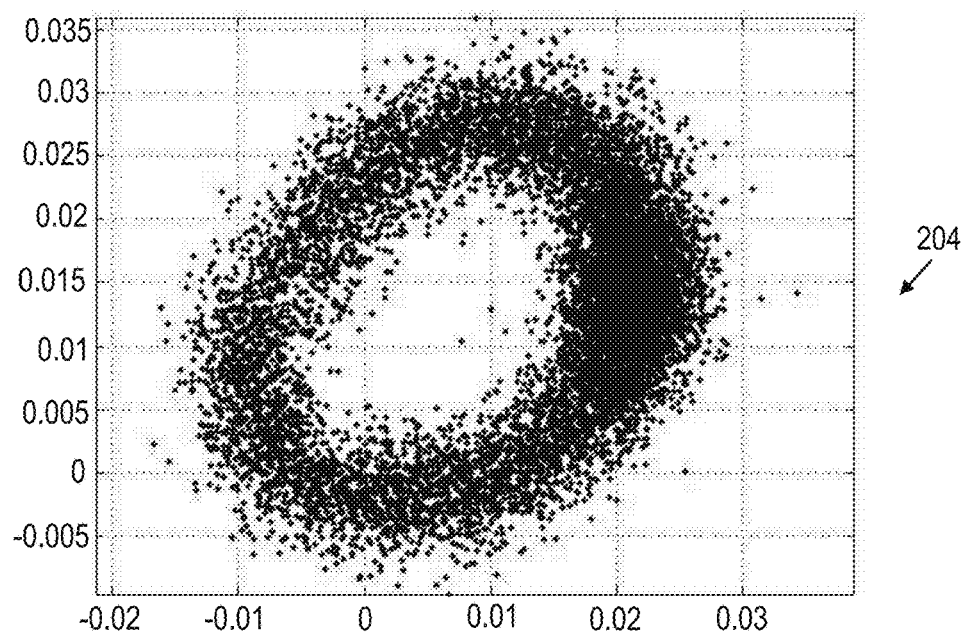
FIG. 5B is a graph showing an I/Q data plot with heavy distortion.

When representing the I/Q data pair in the complex plane, a dither signal may cause the optical phase information to be located around a circle which is the unit circle of radius one centered at the origin (0,0) in the complex Cartesian coordinate system. FIG. 5A shows an example chart 202 representing an I/Q circle in the presence of light distortional effects, while FIG. 5B shows an example chart 204 representing an I/Q. As can be seen in chart 204, the I/Q data appears to exhibit an underlying geometry which can be described best as an ellipse. Thus, in accordance with some embodiments, I/Q balancing is based on ellipse parameters. Advantageously, only a small arc is needed to fit an ellipse, leading to improved tracking of the behavior of I/Q data compared to other I/Q balancing schemes. Furthermore, since the arc for which the ellipse is estimated includes many data points, the influence of outliers is practically eliminated.

Figure 6:
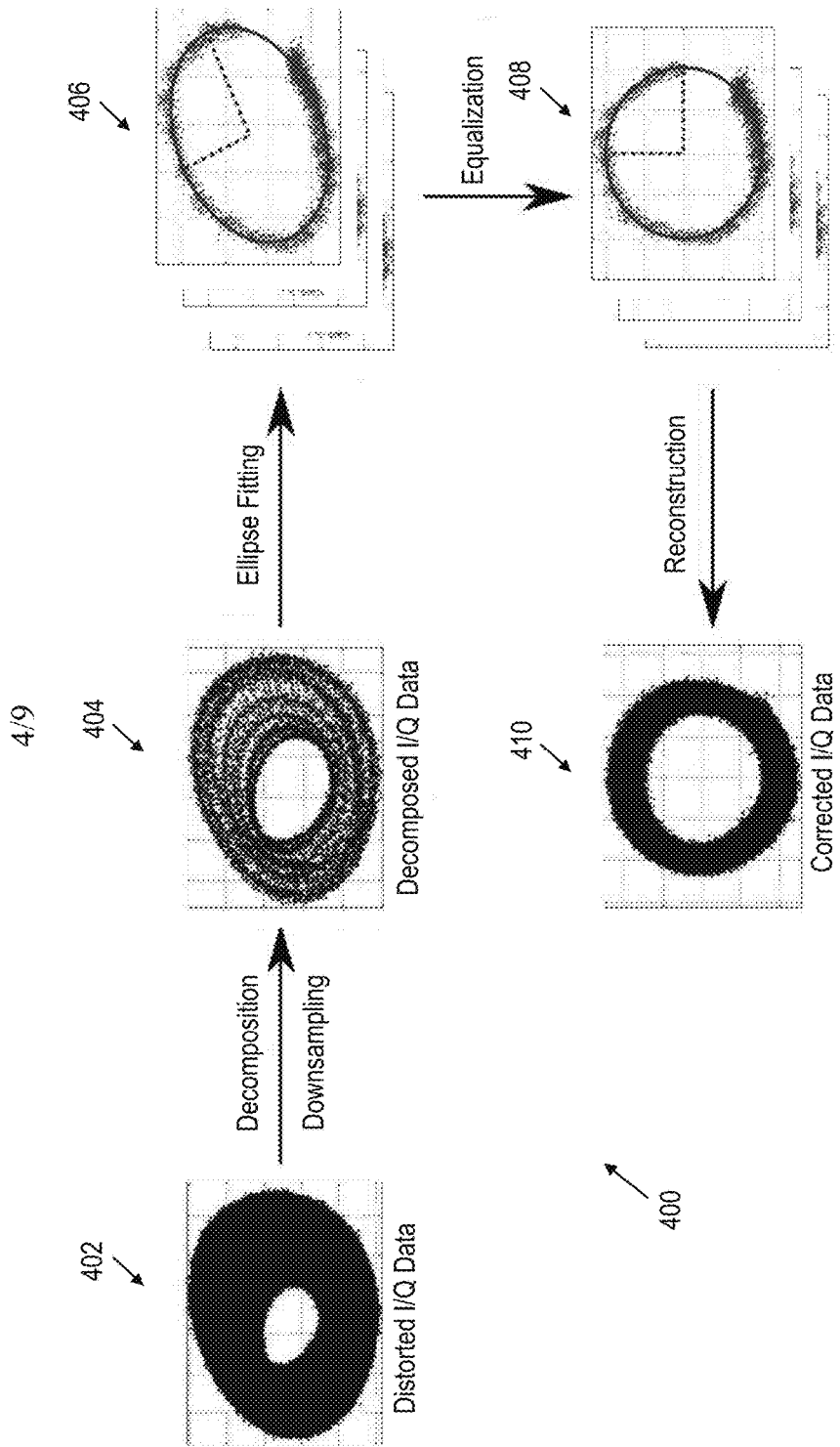
FIG. 6 is a set of graphs showing an I/Q data balancing process.

The circular and ellipse shape for non-distorted and distorted I/Q data, respectively, can be explained by analyzing its path under certain perturbation assumptions. Mathematically, ideal I/Q signals for a single DAS channel can be described as:

$$\begin{cases} I(t) = \sin(2\pi f(t) + x(t)) \\ Q(t) = \cos(2\pi f(t) + x(t)) \end{cases} \quad (10)$$

where f(t) is the dither function, and x(t) is the actual signal that induced the phase modification at a given channel. It will be assumed that x(t) has a small amplitude relative to f(t), that is, the phase disturbance induced by the physical phenomena is small when compared to the phase modulation induced by the dither signal. However, I/Q circles as defined in eq. (10) are rarely observed in a working system. A more realistic model of what the measured I/Q circles look like would be $$\begin{cases} I(t) = a \cdot \sin(2\pi f(t) + \theta) + x_0 \\ Q(t) = b \cdot \cos(2\pi f(t) + \theta) + y_0 \end{cases}, \quad (11)$$

which defines a parametric equation for an ellipse when f(t)=t with radius equal to a and b, centered at position ($x_0$, $y_0$) and rotated by an angle of $\theta$ (see FIG. 6). The radius corresponds to a gain mismatch between the photo-receivers (e.g., single-ended detectors 134a-134c), the center position corresponds to a DC offset, and the angle corresponds to an unknown initial phase. Hence, by fitting an ellipse to the distorted I/Q shape, one can estimate these effects and compensate for them. Moreover, if these values change slowly over time it is still possible to compensate for them if the rate at which the ellipse is traced by the I/Q signals is faster than the rate of change of these parameters.

Finally, considering that the bandwidth of the signal to be measured x(t) generally is much larger than that of the dither signal f(t), it is possible to reduce the effect of x(t) on estimating the distortion parameter by simply filtering the portion of x(t) that is outside the frequency region of f(t). This would allow a more robust distortion estimation and compensation.

Based on these observations, at least some embodiments employ an ellipse fitting approach for I/Q data balancing. FIG. 6 shows an illustrative I/Q data balancing process 400 that starts with distorted I/Q data represented by chart 402. To perform I/Q data balancing, a decomposition step (and possibly a downsampling step) is performed, where the distorted I/Q data is separated according to its different frequency components, resulting in decomposed I/Q data represented by chart 404. In at least some embodiments, the decomposition step corresponds to a multiscale decomposition operation. Ellipse fitting is then performed using a subset of the decomposed I/Q data. More specifically, the decomposed I/Q data for a given frequency component that corresponds to a frequency of the introduced dither signal (i.e., the I/Q data represented by chart 406) may be used. Equalization is then performed, where I/Q correction parameters that adjust the ellipse-fitted data in chart 406 to a circle are determined as represented by chart 408. It should be appreciated that the subset of decomposed I/Q data (each set corresponding to a different frequency band) to be equalized may vary depending on the frequency of the dither signal. Finally, the determined I/Q correction parameters are applied to all the distorted I/Q data (e.g., see chart 402) resulting in corrected I/Q data as represented by chart 410. In at least some embodiments, the application of the I/Q correction parameters corresponds to a multiscale reconstruction operation.

Multiscale Decomposition

In at least some embodiments, the decomposition step in the I/Q data balancing process 400 is performed based on the assumption that the actual information to be recovered is contained within a particular frequency band of the I/Q data. In such case, decimation is performed so that the input I/Q data is represented by less data points. Again, the particular subset of I/Q data used may vary depending on the frequency of the dither signal.

Figure 7:
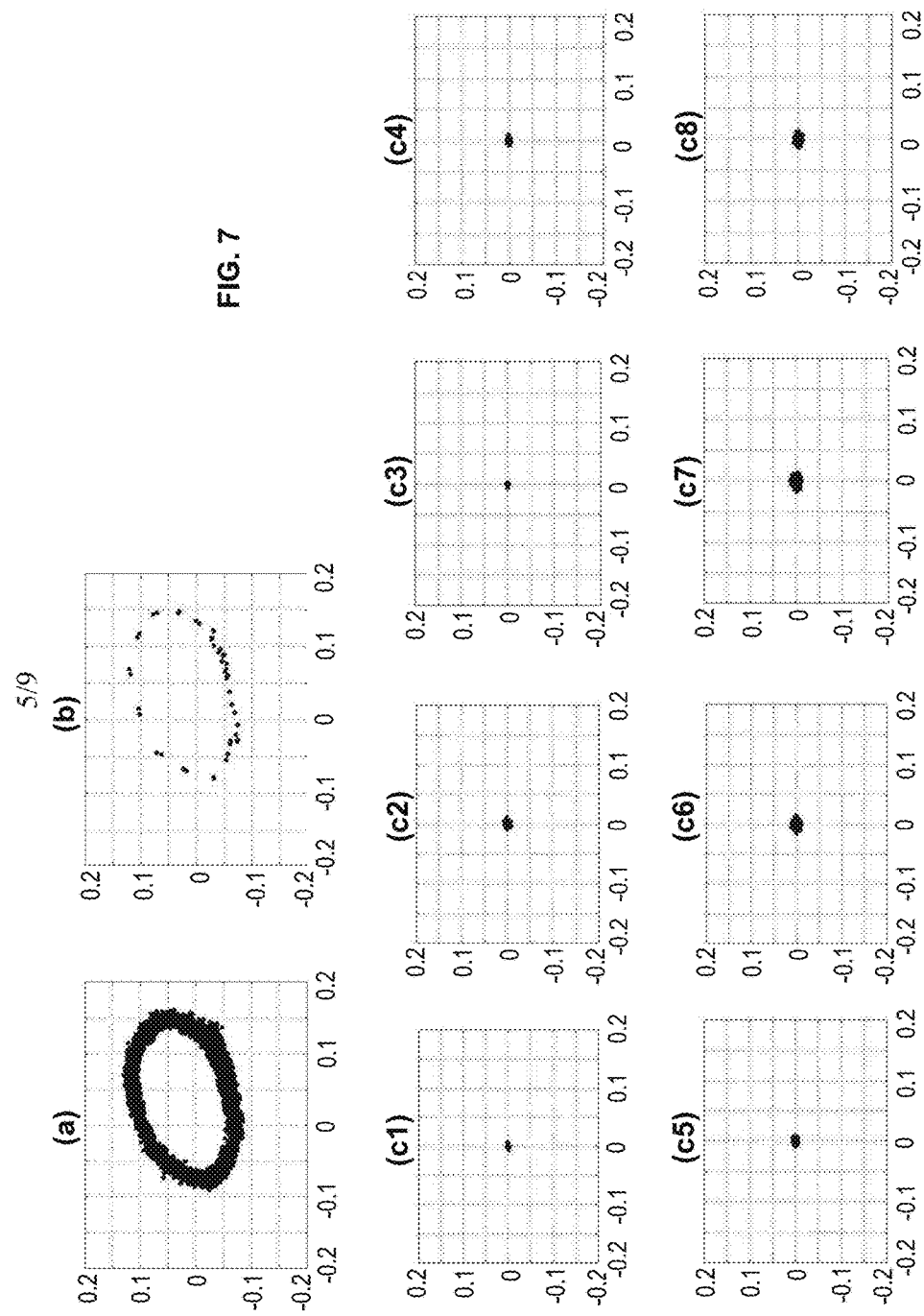
FIG. 7 is a set of graphs showing I/Q data and wavelet coefficients related to a decomposition process.

The decomposed I/Q data for a number of data points, distributed across different frequency bands, is depicted in FIG. 7. More specifically, chart (a) corresponds to the number of I/Q data points, chart (b) corresponds to approximation coefficients for a lowest frequency band (e.g., 0-50 Hz), and charts (c1) to (c8) correspond to approximation coefficients for other higher frequency bands (e.g., between 50 Hz and 10,000 Hz). Regardless of the particular frequency bands represented, it should be appreciated that rather than manipulate all of the distorted I/Q data represented in chart 402 directly, I/Q correction parameters are determined from decomposed I/Q data or approximation coefficients for a particular frequency band. Subsequently, the I/Q correction parameters can be applied to correct all of the distorted I/Q (e.g., using the manipulated I/Q approximation and wavelet coefficients). As an example, I/Q correction parameters and wavelet coefficients may be used in a multiscale reconstruction process to correct distorted I/Q data.

For more information about multiscale decomposition and reconstruction, reference may be had to P. P. Vaidyanathan, *Multirate Systems and Filter Banks*, Prentice Hall, 1$^{st}$ edition (1992); G. Strand, T. Nguyen, *Wavelets and Filter Banks*, Wellesley College, 2$^{nd}$ edition (1996); and S. Mallat, *A Wavelet Tour of Signal Processing*, Academic Press, 3$^{rd}$ edition (2008).

Ellipse Fitting

In at least some embodiments, the ellipse fitting step in I/Q data balancing process 400 is performed by defining a collection of 2-dimensional sample locations ($x_i$, $y_i$), i=1, 2, . . . , N, which are assumed to be noisy observations of an underlying ellipse model. More specifically, if x=[$x^2$ xy $y^2$ x y 1]$^T$ and a=[a b c d e f]$^T$, an ellipse can be expressed by means of the general quadratic curve equation $$F(a,x)=a^Tx=ax^2+bxy+cy^2+dx+ey+f=0, \quad (12)$$

provided that the discriminant is negative such that, for instance, $b^2-4ac<0$. For more than 6 data points equation 12 is over-determined, implying that in the presence of noise it can only be satisfied approximately. Thus, instead of attempting to solve equation 12 directly (which might be unfeasible), the ellipse parameter a is estimated by minimizing the following functional $$\min_a(a^TX^TXa) s.t. a^TCa=1 \quad (13)$$

where X=[$x_1$ $x_2$ . . . ]$^T$ and $a^TCa=1$ is the constraint such that $b^2-4ac<0$ is satisfied. This is a typical least-squares problem which can be solved by using a closed form solution which looks for the eigenvector corresponding to the largest eigenvalue in a generalized eigen-decomposition problem.

However, equation 13 suggests that every time the input data changes the ellipse parameters have to be recalculated from scratch. This is undesirable since it leads to a computationally expensive solution which may result in a real-time implementation being unfeasible. Thus, in at least some embodiments, an adaptive ellipse fitting method is used. For example, assuming there is sufficient initial data such that a first estimate of the ellipse parameters can be computed using equation 13, a recursive algorithm can be developed which uses the latest ellipse parameters, and determines updates whenever a new data point becomes available. In this manner, a computationally fast solution is possible that avoids the need for matrix inversions. Furthermore, in at least some embodiments, data points used for ellipse fitting are weighted according to their arrival time. For example, weighting more recent data points higher than older data points can account for sudden changes of the I/Q circle—a property deemed necessary to obtain a satisfying solution for I/Q circle correction. More specifically, if a factor $\gamma \in (0,1)$ is applied to give more weight to more recent than to older data, it is assured that the ellipse will accompany rapid data changes while simultaneously avoiding singularity issues of the covariance matrix $X^T X$ (the main cause for the ellipse fitting to become unstable).

Equalization

Figure 8:
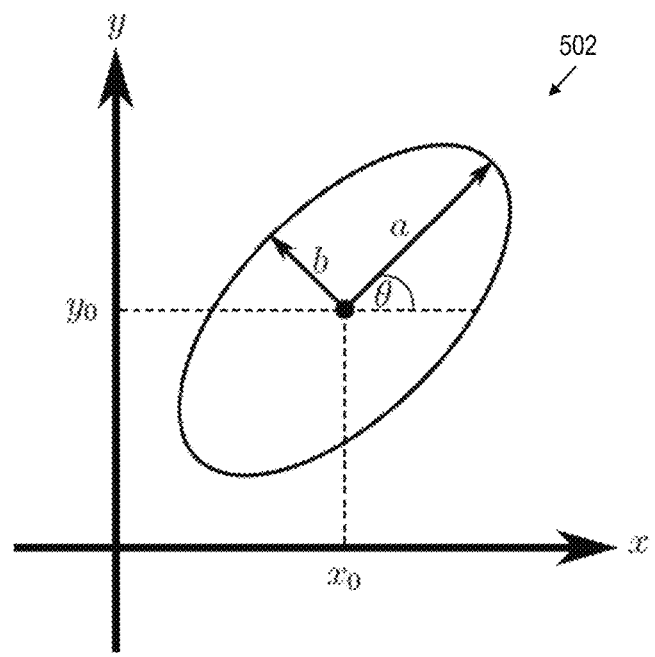
FIG. 8 is a graph showing an ellipse and related parameters.

In at least some embodiments, the equalization step in I/Q data balancing process 400 is performed by using the geometric properties of an ellipse. As illustrated in FIG. 8, an ellipse can be fully characterized by the following properties: 1) a center $(x_0, y_0)$; 2) two semi-axes (a, b); and 3) orientation $\theta$ with respect to the x-axis. Based on these parameters, distorted I/Q data can be corrected such that:

$$\begin{bmatrix} \hat{I}_i \\ \hat{Q}_i \end{bmatrix} = \underbrace{\begin{bmatrix} \cos(\theta) & -\sin(\theta) \\ \sin(\theta) & \cos(\theta) \end{bmatrix}}_{R(\theta)} \underbrace{\begin{bmatrix} 1/a & 0 \\ 0 & 1/b \end{bmatrix}}_{\Sigma} \underbrace{\begin{bmatrix} \cos(\theta) & -\sin(\theta) \\ \sin(\theta) & \cos(\theta) \end{bmatrix}^T}_{R(-\theta)} \left( \begin{bmatrix} I_i \\ Q_i \end{bmatrix} - \begin{bmatrix} x_0 \\ y_0 \end{bmatrix} \right), \quad (14)$$

where $(I_i, Q_i)$ represents the distorted I/Q data pair (e.g., obtained from a multiscale transform), and $(\hat{I}_i, \hat{Q}_i)$ is the corresponding balanced I/Q data pair. Note: even if the ellipse parameters are calculated using only approximation coefficients, the I/Q balancing is performed for all decomposed I/Q data pairs.

Figure 9A:
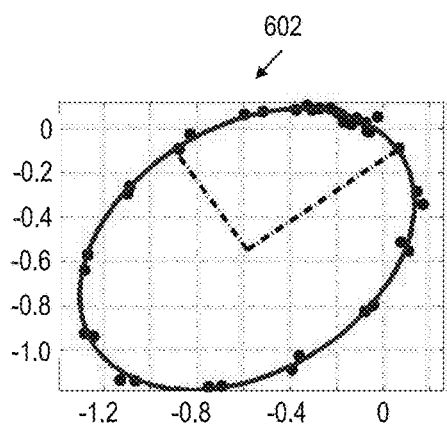
FIGS. 9A and 9B are a set of graphs showing I/Q data before and after an ellipse fitting correction is applied.
Figure 9B:
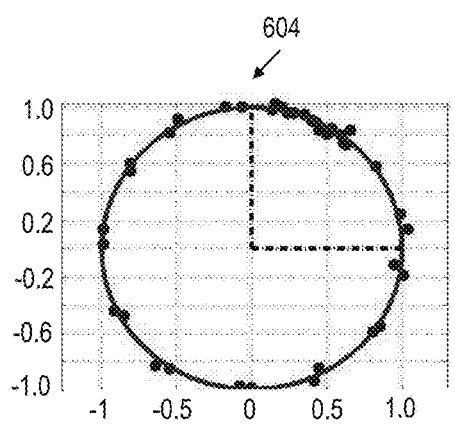

Equation 14 can be interpreted as a composition of three geometrical transformations: a rotation, a scaling, and an inverse rotation. The first rotation matrix $R(-\theta)$ is in charge of bringing the major and minor semi-axes (a, b) parallel to the x- and y-axes, respectively. Next, the scaling matrix $\Sigma$ is applied, stretching or shrinking the data in each direction (e.g., using the ellipses semi-axes lengths as stretching coefficients). Finally, the inverse rotation $R(\theta)$ is applied, mapping the semi-axes back to their original orientation. Chart 602 of FIG. 9A and chart 604 of FIG. 9B represent a set of I/Q data before and after equalization, respectively. It can be observed in charts 602 and 604 that only a few points are necessary to fit the ellipse. In the example of FIGS. 9A and 9B, only 39 approximation coefficients (e.g., obtained by applying an 8-level discrete wavelet transform to a set of 10000 I/Q data points collected at 10 kHz) were used to fit the ellipse.

Multiscale Reconstruction

In at least some embodiments, the reconstruction step of I/Q data balancing process 400 (to obtain corrected I/Q data as in chart 410) is performed by applying an inverse transform to the equalized coefficients. However, it should be appreciated that I/Q correction parameters obtained using process 400 can be applied to distorted I/Q data without an inverse transform.

Test Results

Tests on a set of distorted I/Q data showed that using the disclosed I/Q balancing process the Signal-to-Noise ratio (SNR) can be improved by up to 8 dB when compared to traditional I/Q balancing schemes. However, it should be noted that the amount of improvement depends to a high extent on the behavior of the original I/Q data. For example, for well-behaved I/Q circles such as the one represented by chart 202 of FIG. 5A, almost no improvements can be achieved using the disclosed I/Q balancing since the I/Q circle itself does not need any correction. Another extreme is when the I/Q circle "breaks down" (e.g., due to fading) and does not resemble an ellipse anymore. In such situations the proposed ellipse fitting approach is also unable to yield any improvements when compared to the traditional approach. Nevertheless, in such cases, the disclosed I/Q balancing process can still give a measure of the underlying signal quality, indicating that the extracted phase is unreliable.

Figure 10:
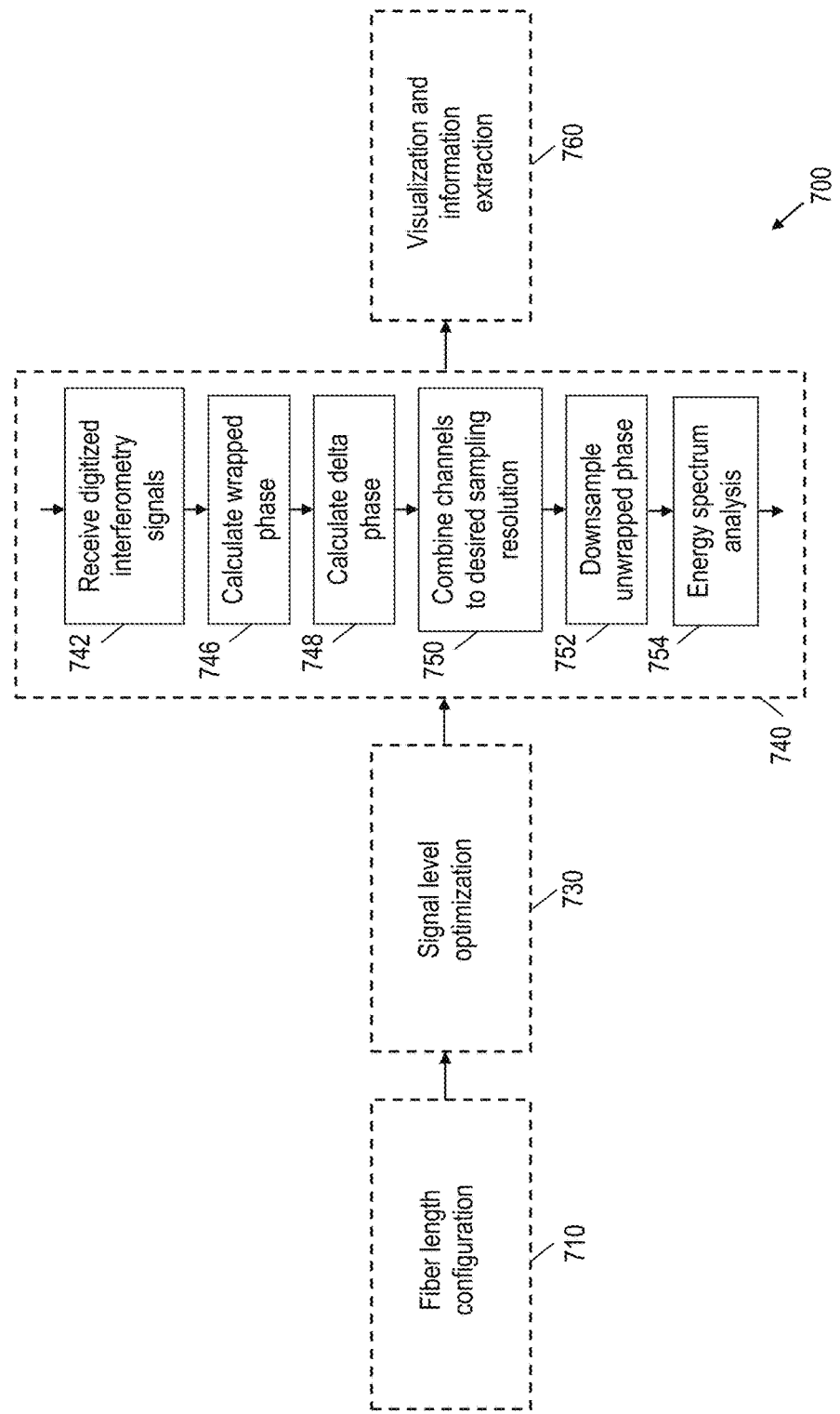
FIG. 10 is a flowchart of an illustrative distributed sensing process.

FIG. 10 shows an illustrative distributed sensing process 700. The process 700 is divided into different stages, including a fiber length configuration stage 710, a signal level optimization stage 730, a data acquisition and processing stage 740, visualization and information extraction stage 760. In the fiber length configuration stage 710, a suitable fiber length is determined, for example, by averaging a number of traces and calculating when a standard deviation (STD) exceeds a threshold. In at least some embodiments, a data acquisition (DAQ) card is configured to collect a number of channels based on the fiber length and a sample rate is set. For example, a suitable sample rate may be around 100,000 samples per kilometer of fiber.

In the signal level optimization stage 730, a suitable signal amplitude is determined, for example, by adjusting a launch erbium-doped fiber amplifier (EDFA) until signal amplitude criteria or thresholds are reached. In at least some embodiments, a digitizer input range and interrogator electronic gain are set to optimize the digitizer range with the signal amplitude.

In the data acquisition and processing stage 740, the photodiode outputs are digitized (e.g., A, B, C, or X, Y, Z) at block 742. At block 744, uncorrected I/Q values are computed from the photodiode outputs (e.g., using equations 7 and 8). At block 746, an amplitude is calculated. For example, the amplitude can be calculated as the square root of $(I^2+Q^2)$. At block 748, I/Q data corrections are performed. For example, an I/Q balancing process that uses multi-scale ellipse fitting as described herein may be applied to perform the I/Q data corrections. At block 750, a wrapped phase is calculated using the corrected I/Q values (e.g., phase=a tan 2(Q,I)). At block 752, a delta phase is calculated by comparing the current phase value with a previous phase value, and phase unwrapping is performed. At block 754, channels are combined to a desired sampling resolution. For example, a weighting factor (e.g., the squared amplitude) can be applied for each channel at block 754. At block 756, the unwrapped phase is downsampled to a desired sample rate. For example, a low pass filter and decimation may be applied at block 756 to downsample the unwrapped phase.

In the visualization and information extraction stage 760, a waterfall plot is calculated using variance of phase over a short time period (e.g., 50 milliseconds). Further, distributed sensing parameters and/or derived data recovered from the distributed sensing process 700 may be used to analyze downhole properties or events. As a specific example, acoustic data recovered from the distributed sensing process 700 may be used to monitor seismic fracturing, fluid flow, stimulation or treatment operations, production, etc.

Figure 11A:
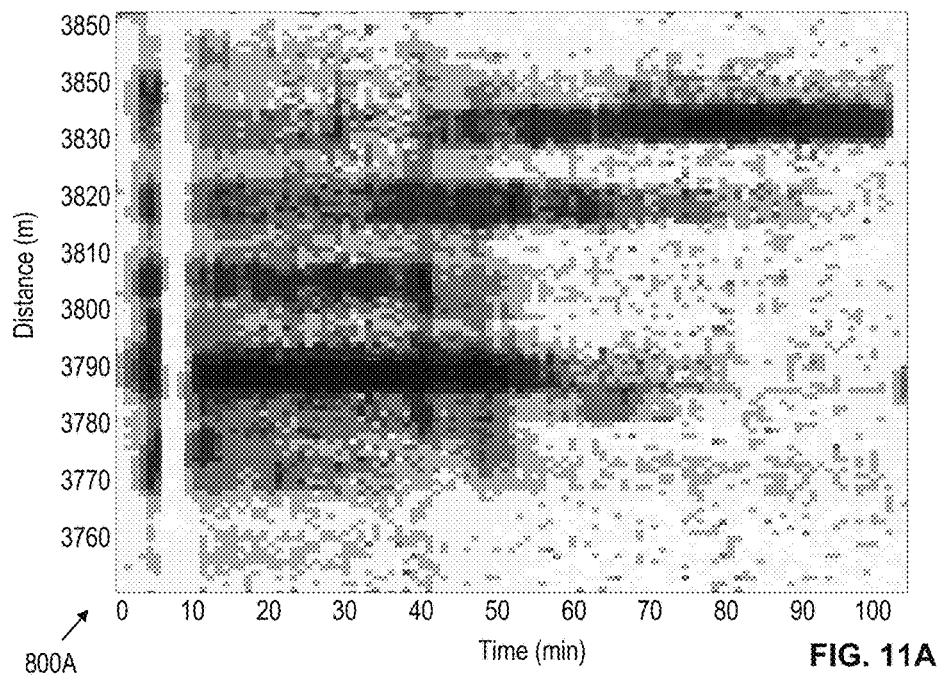
FIGS. 11A and 11B are graphs showing a representation of acoustic data obtained from a distributed sensing process.
Figure 11B:
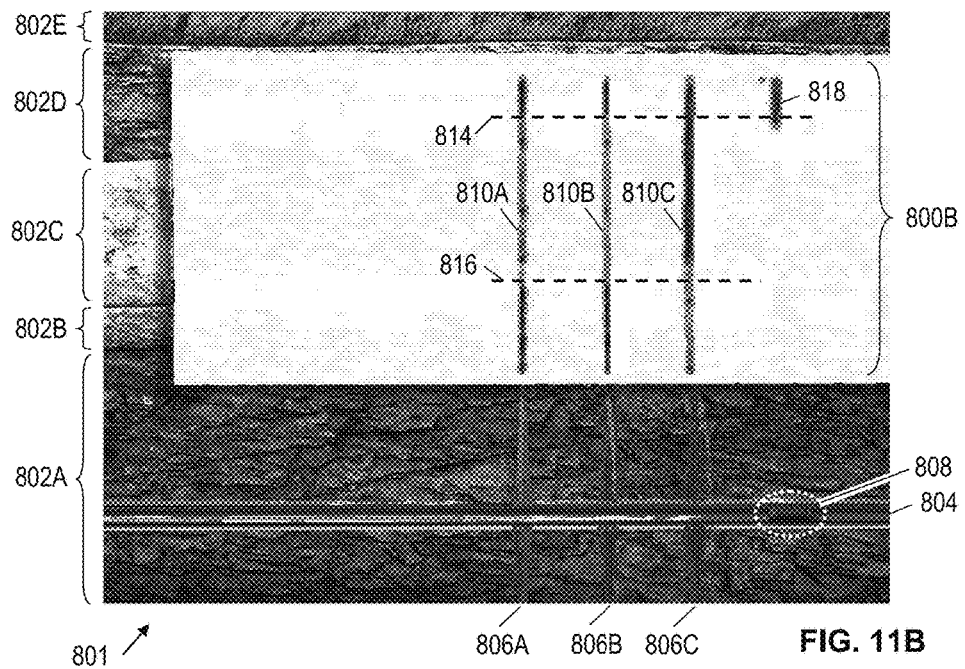

FIGS. 11A and 11B show graphs 800A and 800B representing acoustic data obtained from a distributed sensing process, where the disclosed I/Q balancing process has been applied to improve the accuracy of the represented data. In graphs 800A and 800B, acoustic data intensity is represented by grayscale shade (darker=more intense) as a function of time and position. For graph 800A, the represented acoustic data moves from right-to-left over time and may correspond to acoustic data intensity for all frequencies, or for one or more particular frequency bands.

In downhole scenario 801 of FIG. 11B, various formation layers 802A-802E, a well 804, perforations 806A-806C, and a plug 808 are represented. Further, graph 800B represents acoustic data related to downhole scenario 801, where the oldest acoustic activity is at the top and progresses downward over time. As an example, the acoustic data of graph 800B may represent an injection operation that initially results in acoustic activity 818 at or near plug 808 (e.g., a leak), acoustic activity 810A at or near perforation 806A, acoustic activity 810B at or near perforation 806B, and acoustic activity 810C at or near perforation 806C. In an alternative scenario, acoustic activity may occur at or near the location of sliding sleeves along the well 808. The acoustic activity 818 and 810A-810C may correspond to "whistling" or other detectable acoustic content. At time 814, the injection operations introduce a proppant that causes the acoustic activity 818 at or near plug 808 to end (e.g., the leak is plugged or no longer produces acoustic content), and causes the acoustic activity 810A and 810B to decrease over time. Meanwhile, the acoustic activity 810C at or near perforation 806C is not significantly affected by the introduction of a proppant. At time 816, the injection operations introduce diverters that cause the acoustic activity 810A-810C to change. More specifically, the acoustic activity 810C decreases while the acoustic activity 810A and 810B increases due to the introduction of diverters.

Figure 12:
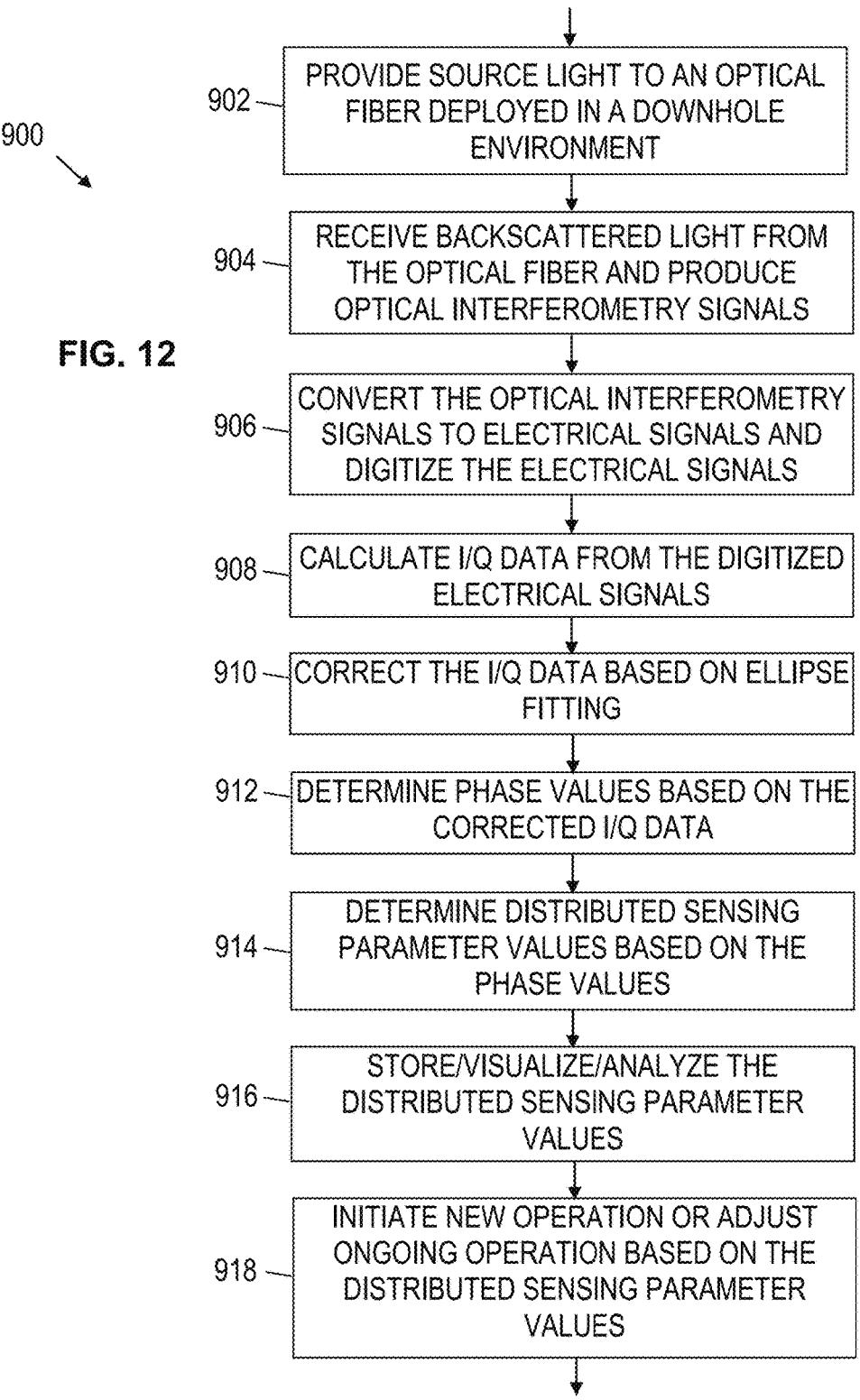
FIG. 12 is a flowchart of a distributed sensing method.

The graphs 800A and 800B are merely examples of visualizing distributed sensor parameters values. Without limitation, such distributed sensing parameters can be visualized and/or analyzed to monitor low rate gas flow through perforations, gas flow up a wellbore, liquid dominant multiphase flow through a restriction, gas injection, sand injection, the amount of profit due to fracturing, seismic activity, and/or other events correlated with an acoustic pattern or signature. Further, such distributed sensing parameters values visualized and/or analyzed to monitor downhole operations, to monitor the progress and effect of introducing proppants or other treatments, and/or to make decisions based on such monitoring. FIG. 12 shows an illustrative distributed sensing method 900. In method 900, source light is provided to an optical fiber deployed in a downhole environment at block 902. At block 904, backscattered light is received from the optical fiber and optical interferometry signals are produced (e.g., A, B, C, or X, Y, Z). At block 906, the optical interferometry signals are converted to electrical signals and the electrical signals are digitized. At block 908, I/Q data is calculated from the digitized electrical signals. At block 910, the I/Q data is corrected based on ellipse fitting as described herein. At block 912, phase values are determined based on the corrected I/Q data. At block 914, distributed sensing parameters are determined based on the phase values. At block 916, the distributed sensing parameter values are stored, visualized, and/or analyzed. At block 918, a new operation is initiated or an ongoing operation is adjusted based on the distributed sensing parameter values. For example, the distributed sensing parameter values at blocks 916 and 918 may be used for real-time fluid flow monitoring using acoustic signatures, flow-regime determination, wellbore integrity monitoring, event detection, seismic fracture monitoring, stimulation or treatment operations, production, etc.

Embodiments disclosed herein include:

A: A system that comprises an optical fiber, an interrogator to provide source light to the optical fiber, and a receiver coupled to the optical fiber. The receiver comprises at least one fiber optic coupler that receives backscattered light and that produces optical interferometry signals from the backscattered light, and photo-detectors that produce an electrical signal for each of said optical interferometry signals. The system also comprises at least one digitizer that digitizes the electrical signals, and at least one processing unit that calculates I/Q data from the digitized electrical signals, corrects the I/Q data based on ellipse fitting, determines phase values based on the corrected I/Q data, and determines distributed sensing parameter values based on the phase values.

B: A method that comprises providing source light to an optical fiber deployed in a downhole environment. The method also comprises receiving backscattered light from the optical fiber and producing optical interferometry signals from the backscattered light. The method also comprises converting the optical interferometry signals to electrical signals and digitizing the electrical signals. The method also comprises calculating I/Q data from the digitized electrical signals, correcting the I/Q data based on ellipse fitting, determining phase values based on the corrected I/Q data, and determining distributed sensing parameter values based on the phase values.

Each of embodiments A and B may have one or more of the following additional elements in any combination: Element 1: further comprising a monitor in communication with the at least one processing unit to display the distributed sensing parameter values or data derived from the distributed sensing parameter values. Element 2: the at least one processing unit performs said ellipse fitting by decomposing the I/Q data into separate groups and selecting one of the groups based on a dither signal frequency. Element 3: the at least one processing unit downsamples the I/Q data to perform said ellipse fitting. Element 4: the at least one processing unit performs ellipse fitting based on a least-squares solution. Element 5: the at least one processing unit performs ellipse fitting based on an adaptive least-squares solution that updates a previous solution as new data points become available. Element 6: the adaptive least-squares solution applies weights to I/Q data points, where newer I/Q data points are given more weight than older I/Q data points. Element 7: the at least one processing unit determines a rotation parameter, a scaling parameter, and an inverse rotation parameter based on said ellipse fitting, and applies the rotation parameter, the scaling parameter, and the inverse rotation parameter to correct the I/Q data. Element 8: the distributed sensing parameter values correspond to acoustic values. Element 9: the receiver corresponds to a homodyne or heterodyne receiver for distributed acoustic sensing. Element 10: the optical fiber is deployed downhole via at least one of drill pipe, coiled tubing, slick line or electric line, or is spooled off of a component that is dropped or pumped downhole. Element 11: further comprising a tool that initiates or adjusts a downhole operation based on the distributed sensing parameter values.

Element 12: further comprising displaying the distributed sensing parameter values or data derived from the distributed sensing parameter values. Element 13: further comprising performing said ellipse fitting by decomposing the I/Q data into separate groups and selecting one of the groups based on a dither signal frequency. Element 14: further comprising downsampling the I/Q data to perform said ellipse fitting. Element 15: further comprising performing said ellipse fitting based on an adaptive least-squares solution that updates a previous solution as new data points become available. Element 16: further comprising applying a rotation parameter, a scaling parameter, and an inverse rotation parameter to the I/Q data based on results of said ellipse fitting. Element 17: further comprising deploying the optical fiber downhole via at least one of drill pipe, coiled tubing, slick line or electric line, or spooling the optical fiber off of a component that is dropped or pumped downhole. Element 18: further comprising initiating or adjusting a downhole operation based on the distributed sensing parameter values.

Numerous variations and modifications will become apparent to those skilled in the art once the above disclosure is fully appreciated. It is intended that the following claims be interpreted to embrace all such variations and modifications.

What is claimed is:

1. A system, comprising:
   an optical fiber;
   an interrogator to provide source light to the optical fiber; and
   a receiver coupled to the optical fiber, wherein the receiver comprises:
      at least one fiber optic coupler that receives backscattered light and that produces optical interferometry signals from the backscattered light;
      photo-detectors that produce electrical signals, wherein each of said optical interferometry signals is used to produce an electrical signal of the electrical signals;
      at least one digitizer that digitizes the electrical signals into digitized electrical signals; and
      at least one processor to:
         generate a dither signal that is transmitted through the optical fiber,
         calculate in-phase and quadrature signals (I/Q) data from the digitized electrical signals,
         correct the I/Q data based on ellipse fitting to generate corrected I/Q data, wherein the ellipse fitting comprises decomposing the I/Q data into separate groups and selecting one of the separate groups based on a frequency of the dither signal,
         determine phase values based on the corrected I/Q data, and
         determine distributed sensing parameter values based on the phase values.

2. The system of claim 1, further comprising a monitor in communication with the at least one processor to display the distributed sensing parameter values or data derived from the distributed sensing parameter values.

3. The system of claim 1, wherein the at least one processor downsamples the I/Q data to perform said ellipse fitting.

4. The system of claim 1, wherein the at least one processor performs ellipse fitting based on a least-squares solution.

5. The system of claim 1, wherein the at least one processor performs ellipse fitting based on an adaptive least-squares solution that updates a previous solution as new data points become available.

6. The system of claim 5, wherein the adaptive least-squares solution applies weights to I/Q data points, where newer I/Q data points are given more weight than older I/Q data points.

7. The system of claim 1, wherein the at least one processor determines a rotation parameter, a scaling parameter, and an inverse rotation parameter based on said ellipse fitting, and applies the rotation parameter, the scaling parameter, and the inverse rotation parameter to correct the I/Q data.

8. The system of claim 1, wherein the distributed sensing parameter values correspond to acoustic values.

9. The system of claim 1, wherein the receiver corresponds to a homodyne or heterodyne receiver for distributed acoustic sensing.

10. The system of claim 1, wherein the optical fiber is deployed downhole via at least one of drill pipe, coiled tubing, slick line or electric line, or is spooled off of a component that is dropped or pumped downhole.

11. The system of claim 1, further comprising a tool that initiates or adjusts a downhole operation based on the distributed sensing parameter values.

12. A method, comprising:
    providing source light to an optical fiber deployed in a downhole environment;
    receiving backscattered light from the optical fiber and producing optical interferometry signals from the backscattered light;
    converting the optical interferometry signals to electrical signals and digitizing the electrical signals into digitized electrical signals;
    calculating in-phase and quadrature signals (I/Q) data from the digitized electrical signals;
    generating a dither signal that travels through the optical fiber;
    correcting the I/Q data based on ellipse fitting, wherein the ellipse fitting comprises decomposing the I/O data into separate groups and selecting one of the groups based on a dither signal frequency;
    determining phase values based on the corrected I/Q data; and
    determining distributed sensing parameter values based on the phase values.

13. The method of claim 12, further comprising displaying the distributed sensing parameter values or data derived from the distributed sensing parameter values.

14. The method of claim 12, further comprising downsampling the I/Q data to perform said ellipse fitting.

15. The method of claim 12, further comprising performing said ellipse fitting based on an adaptive least-squares solution that updates a previous solution as new data points become available.

16. The method of claim 12, further comprising applying a rotation parameter, a scaling parameter, and an inverse rotation parameter to the I/Q data based on results of said ellipse fitting.

17. The method of claim 12, further comprising deploying the optical fiber downhole via at least one of drill pipe, coiled tubing, slick line or electric line, or spooling the optical fiber off of a component that is dropped or pumped downhole.

18. The method of claim 12, further comprising initiating or adjusting a downhole operation based on the distributed sensing parameter values.

19. A non-transient information storage media storing instructions to:
    provide source light to an optical fiber deployed in a downhole environment;
    receive backscattered light from the optical fiber and producing optical interferometry signals from the backscattered light;
    convert the optical interferometry signals to electrical signals and digitizing the electrical signals into digitized electrical signals;
    calculate in-phase and quadrature signals (I/Q) data from the digitized electrical signals;

generate a dither signal that travels through the optical fiber, wherein the dither signal has a dither signal frequency;

correct the I/Q data based on ellipse fitting, wherein the ellipse fitting comprises decomposing the I/Q data into separate groups and selecting a selected group corresponding with the dither signal frequency;

determine phase values based on the corrected I/Q data; and determine distributed sensing parameter values based on the phase values.

20. The non-transient information storage media of claim 19, wherein the instructions to correct the I/Q data further comprise instructions to:

determine ellipse parameters based on the selected group; and correct a second group of the I/Q data based on the ellipse parameters, wherein the second group and the selected group have different data points.

* * * * *